US012680852B2

(12) United States Patent
Cunningham et al.

(10) Patent No.: US 12,680,852 B2
(45) Date of Patent: Jul. 14, 2026

(54) METHOD FOR PERFORMING TEMPERATURE COMPENSATION OF MAXIMUM SENSOR CURRENT AND TEST TONE AMPLITUDE DURING METER VERIFICATION

(71) Applicant: Micro Motion, Inc., Boulder, CO (US)

(72) Inventors: Timothy J. Cunningham, Boulder, CO (US); Miles Keeney-Ritchie, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 1259 days.

(21) Appl. No.: 16/315,036

(22) PCT Filed: Jul. 20, 2016

(86) PCT No.: PCT/US2016/043180
§ 371 (c)(1),
(2) Date: Jan. 3, 2019

(87) PCT Pub. No.: WO2018/017080
PCT Pub. Date: Jan. 25, 2018

(65) Prior Publication Data
US 2019/0310121 A1      Oct. 10, 2019

(51) Int. Cl.
*G01F 1/84* (2006.01)
*G01F 15/02* (2006.01)

(52) U.S. Cl.
CPC .......... *G01F 1/8436* (2013.01); *G01F 1/8422* (2013.01); *G01F 1/8431* (2013.01); *G01F 15/022* (2013.01)

(58) Field of Classification Search
CPC .... G01F 1/8436; G01F 15/022; G01F 1/8431; G01F 1/8422
See application file for complete search history.

(56) References Cited

U.S. PATENT DOCUMENTS

| | | | | |
|---|---|---|---|---|
| 5,451,846 A * | 9/1995 | Peterson | ................. | H02P 7/298 |
| | | | | 318/400.26 |
| 6,731,450 B1 * | 5/2004 | Codilian | .............. | G11B 33/144 |
| | | | | 360/75 |
| 7,750,642 B2 * | 7/2010 | Graber | .................... | G01F 25/10 |
| | | | | 73/861.12 |
| 2007/0186684 A1 * | 8/2007 | Pham | ...................... | G01F 1/849 |
| | | | | 73/861.357 |

(Continued)

FOREIGN PATENT DOCUMENTS

WO          2012018323 A1      2/2012

*Primary Examiner* — Shelby A Turner
*Assistant Examiner* — Brandon J Becker
(74) *Attorney, Agent, or Firm* — The Ollila Law Group LLC

(57)          ABSTRACT

A method of determining optimal resistance and compensating for temperature variations in determining a test tone is presented. The optimal resistance in a drive circuit amplifier and drive coil and using the optimal resistance to improve the accuracy of a test tone used in the calibration of a flow meter is presented. The optimal resistance is calculated using a linear extrapolation of the resistance change of the circuit with respect to temperature. The optimal resistance is then used to calculate the proper maximum sensor current (MSC) value using an equation derived from Ohm's law, and from the MSC a test tone level is calculated.

19 Claims, 3 Drawing Sheets

(56)         References Cited

U.S. PATENT DOCUMENTS

| | | | | |
|---|---|---|---|---|
| 2008/0281535 | A1* | 11/2008 | Rensing | G01F 1/8413 |
| | | | | 702/56 |
| 2010/0275701 | A1* | 11/2010 | Foss | G01K 13/00 |
| | | | | 73/861.12 |
| 2011/0030450 | A1* | 2/2011 | Wright | G01N 33/0018 |
| | | | | 73/861.18 |
| 2012/0179407 | A1* | 7/2012 | Ge | G01K 7/02 |
| | | | | 702/99 |
| 2013/0121376 | A1* | 5/2013 | Mansfield | G01F 15/022 |
| | | | | 374/170 |
| 2013/0333484 | A1* | 12/2013 | Henry | G01F 1/8486 |
| | | | | 73/861.356 |
| 2013/0338943 | A1* | 12/2013 | Kolahi | G01F 1/8495 |
| | | | | 702/56 |
| 2014/0114589 | A1 | 4/2014 | Henry et al. | |
| 2014/0330439 | A1* | 11/2014 | Cunningham | G01F 25/10 |
| | | | | 700/282 |
| 2015/0177035 | A1* | 6/2015 | Rovner | G01F 1/60 |
| | | | | 73/861.12 |

* cited by examiner

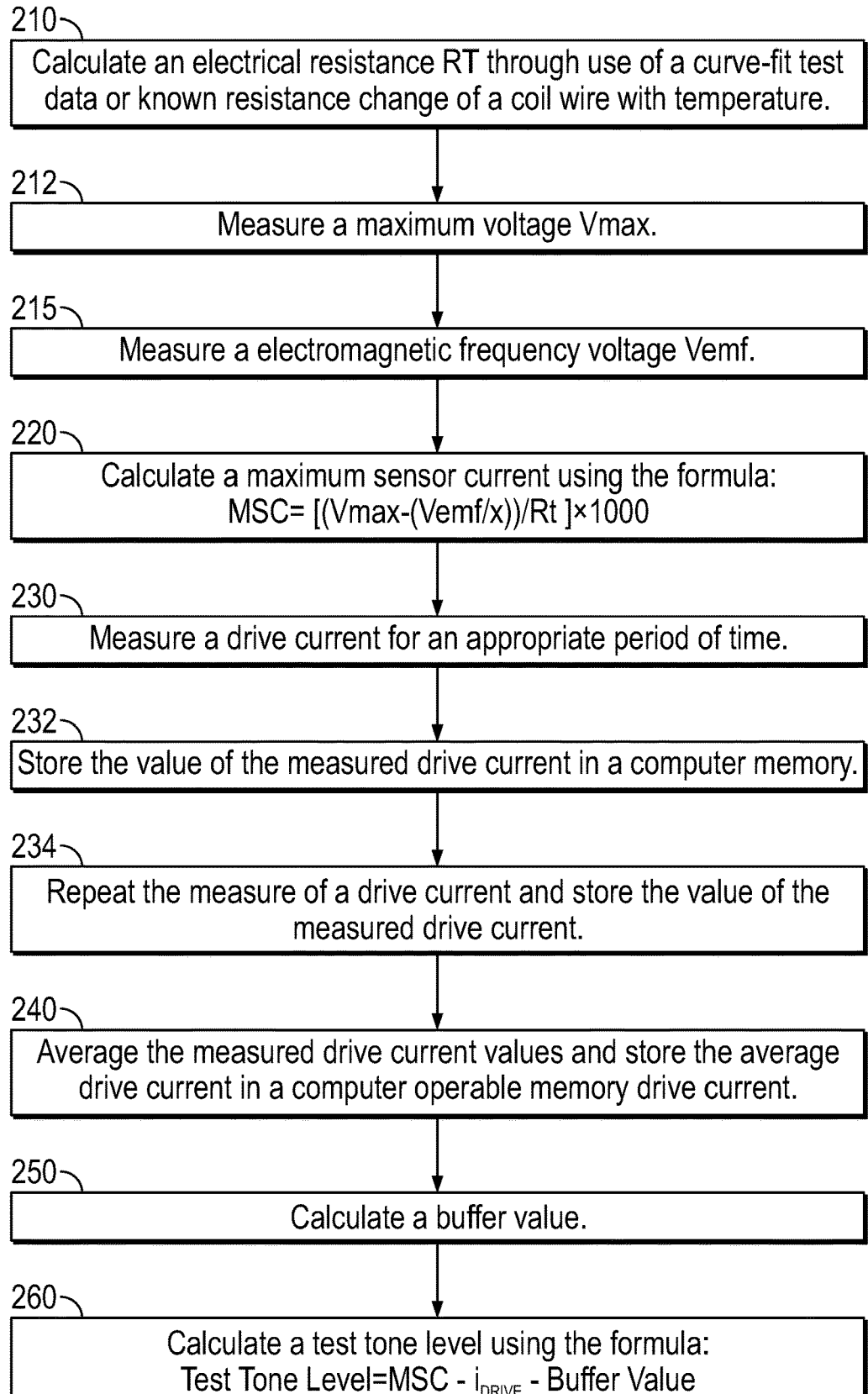

210 — Calculate an electrical resistance RT through use of a curve-fit test data or known resistance change of a coil wire with temperature.

212 — Measure a maximum voltage Vmax.

215 — Measure a electromagnetic frequency voltage Vemf.

220 — Calculate a maximum sensor current using the formula:
MSC= [(Vmax-(Vemf/x))/Rt ]×1000

230 — Measure a drive current for an appropriate period of time.

232 — Store the value of the measured drive current in a computer memory.

234 — Repeat the measure of a drive current and store the value of the measured drive current.

240 — Average the measured drive current values and store the average drive current in a computer operable memory drive current.

250 — Calculate a buffer value.

260 — Calculate a test tone level using the formula:
Test Tone Level=MSC - $i_{DRIVE}$ - Buffer Value

FIG. 2

METHOD FOR PERFORMING TEMPERATURE COMPENSATION OF MAXIMUM SENSOR CURRENT AND TEST TONE AMPLITUDE DURING METER VERIFICATION

TECHNICAL FIELD

The present invention relates to flowmeters and particularly to a Coriolis-based method for compensating for temperature variations in determining test tone levels during flow meter verification.

BACKGROUND OF THE INVENTION

Vibrating conduit transducers contained as a component of Coriolis mass flowmeters and vibrating densitometers, typically operate by detecting motion of a vibrating conduit that contains a flowing material. Properties associated with the flowing material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A typical Coriolis mass flowmeter includes one or more conduits (also called flow tubes) that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by a driver, e.g., an electromechanical device, such as a voice coil-type actuator, that perturbs the conduit in a periodic fashion.

A drive coil and magnet may be located between the flow tubes and drives the Coriolis flowmeter at resonance. A feedback control system in the flowmeter electronics applies a sinusoidal current to the drive coil to maintain resonance at a specific amplitude. Two pickoff coils and magnets produce a voltage in response to the resonance motion. The pickoffs are used as the feedback signal to control amplitude. The transmitter's digital signal processing uses the pickoff responses to estimate the frequency of vibration used in the density measurement, as well as the time delay between the two pickoff sinusoids needed for the mass flow measurement.

Mass flow rate may be determined by measuring time delay or phase differences between motions at the transducer locations. Two or more such transducers (or pickoff sensors) are typically employed in order to measure a vibrational response of the flow tube or conduits, and are typically located at positions upstream and downstream of the driver. Instrumentation receives signals from the pickoff sensors and processes the signals in order to derive a mass flow rate measurement. The sensor contains a drive circuit containing a drive coil and provides the electronics to drive and read the sensor. Outside the sensor is mounted a core processor which contains a drive amplifier.

Coriolis meters offer high accuracy for single phase flows. However, a Coriolis flowmeter must be properly installed and calibrated to ensure accuracy. One means of calibration is to measure the stiffness of the flow tubes within the flow meter.

Meter verification is a diagnostic tool that measures flow meter flow tube stiffness and compares the measured stiffness to a defined standard factory baseline stiffness. If the flow meter stiffness is equal to the factory baseline, then the calibration factor is correct and the meter will meet its mass flow accuracy specification. Such verification serves to confirm the accuracy, calibration, and the structural integrity of a flow meter.

Meter verification may be performed by injecting one or more tones on either side of the drive frequency of the sensor. Test tones are a special class of artificially-created signals used for testing the integrity of the flow tube and electronics to identify changes in the calibration. A series of tones may be added to the drive signal. These tones excite off-resonance responses in the two pickoffs. The embedded flow meter electronics measures these tonal inputs and responses. By reading the response of the sensor and generating the corresponding frequency response function, the stiffness of the tubes can be estimated.

When meter verification is performed at a temperature higher than room temperature, resistance inside the drive coil increases and the increase in resistance may lower the current level at which the drive amplifier saturates. Current that exceeds the current level may saturate the drive voltage and over drive the amplifier, which causes the amplifier to clip the voltage waveform. Such voltage clipping introduces large amounts of noise into the stiffness estimates. This produces errors and bias into the stiffness estimates which increases stiffness uncertainty.

A solution to temperature induced current level saturations is to establish a maximum sensor current (MSC), which may be used to determine and set a limit for the current output from the drive amplifier. The MSC may also define how much of the drive current is available for powering meter verification test tones.

The MSC is the maximum current the drive amplifier can deliver to the drive coil. It is a function of the maximum voltage in the linear range of the amplifier, the back EMF of the coil and the coil circuit resistance. The present application proposes a solution which uses MSC to compensate for and correct temperature induced amplifier saturation bias error.

SUMMARY OF THE INVENTION

A method is provided. According to an embodiment, the method comprises calculating an electrical resistance, calculating a MSC using the electrical resistance, measuring a plurality of drive current during an appropriate period of time, averaging the plurality of drive currents, calculating a buffer value using the average of the plurality of drive currents, and calculating a test tone level using the MSC and the buffer value.

A method of performing temperature compensation of a test tone amplitude during meter verification in a flow meter is provided. According to an embodiment, the method comprises calculating an electrical resistance using one of a curve-fit of test data and the known resistance change of the coil wire with temperature, calculating a MSC using the electrical resistance, maximum voltage and an EMF voltage, measuring a plurality of drive currents for an appropriate period of time, averaging the plurality of drive currents, calculating a buffer value using the average of the drive currents, and calculating a test tone level using the MSC and the buffer value.

A meter electronics for dynamically optimizing MSC in a flow meter is provided. According to an embodiment, the method comprises an interface for receiving a plurality of temperature values and corresponding electrical resistance values, sensor current, maximum voltage, EMF voltage and drive currents, a storage system for storing and retrieving the plurality of temperature values and the corresponding electrical resistance values, sensor current, maximum voltage, EMF voltage and drive currents, and a processing system for measuring a plurality of drive currents for an appropriate period of time and performing calculations using the interface.

Aspects of the Invention

In one aspect of the invention, the method comprising:
calculating an electrical resistance;
calculating a MSC using the electrical resistance;
measuring a plurality of drive current during an appropriate period of time;
averaging the plurality of drive currents;
calculating a buffer value using the average of the plurality of drive currents; and
calculating a test tone level using the MSC and the buffer value.

Preferably, calculating an electrical resistance further comprises using a curve-fit of test data.

Preferably, calculating an electrical resistance further comprises using the known resistance change of the coil wire with temperature.

Preferably, calculating the MSC comprises using the formula:

$$\text{MSC} = \left[ \frac{V_{max} - \left( \frac{V_{emf}}{x_{rf}} \right)}{R_T} \right] \times 1000.$$

Preferably, the buffer value is calculated using the formula:

$$BufferValue = x_{ptl}(MSC - i_{Drive}).$$

Preferably, the buffer value is calculated using the formula:

$$\text{Buffer Value} = x_{ndev}\sigma.$$

Preferably, the test tone level is calculated by the formula:

$$\text{Test Tone Level} = MSC - i_{Drive} - \text{Buffer Value.}$$

Preferably, if the test tone level is negative, then the meter verification will abort due to unstable process conditions.

Preferably, if the test tone level is positive, then the recently calculated MSC and tone level values are written into the appropriate registers and meter verification is initiated.

In another aspect of the invention, the method of performing temperature compensation of a test tone amplitude during meter verification in a flow meter comprising:
calculating an electrical resistance using one of a curve-fit of test data and the known resistance change of the coil wire with temperature;
calculating a MSC using the electrical resistance, maximum voltage and an EMF voltage;
measuring a plurality of drive currents for an appropriate period of time;
averaging the plurality of drive currents;
calculating a buffer value using the average of the drive currents;
calculating a test tone level using the MSC and the buffer value.

Preferably, calculating a test tone level using the MSC, the buffer value, and the formula:

$$\text{Test Tone Level} = MSC - i_{Drive} - \text{Buffer Value.}$$

Preferably, the MSC is calculated using the formula:

$$\text{MSC} = \left[ \frac{V_{max} - \left( \frac{V_{emf}}{x_{rf}} \right)}{R_T} \right] \times 1000.$$

Preferably, the buffer value is calculated using the formula:

$$\text{Buffer Value} = x_{ptl}(MSC - i_{Drive}).$$

Preferably, the buffer value is calculated using the formula:

$$\text{Buffer Value} = x_{ndev}\sigma.$$

Preferably, if the test tone level is negative, then the meter verification will abort due to unstable process conditions.

Preferably, if the test tone level is positive, then the recently calculated MSC and tone level values are written into the appropriate computer operable memory registers and meter verification is initiated.

In yet another aspect of the invention, a meter electronics for dynamically optimizing MSC in a flow meter, comprising:
an interface for receiving a plurality of temperature values and corresponding electrical resistance values, sensor current, maximum voltage, EMF voltage and drive currents;
a storage system for storing and retrieving the plurality of temperature values and the corresponding electrical resistance values, sensor current, maximum voltage, EMF voltage and drive currents;
a processing system for measuring a plurality of drive currents for an appropriate period of time and performing calculations using the interface.

Preferably, the calculations performed further comprise:
extrapolation calculations using the plurality of temperature values and the corresponding resistance values and produce an optimal resistance;

maximum sensor calculations using the electrical resistance, a maximum voltage and an EMF voltage computed;

averaging the plurality of drive currents, buffer value calculations using the average of the drive currents in the computer processor, and test tone calculation level using the MSC.

Preferably, the buffer value is calculated using one of:

$$\text{Buffer Value} = x_{ptl}(MSC - i_{Drive}) \text{ and Buffer Value} = x_{ndev}\sigma.$$

Preferably, if the test tone level is negative, then the meter verification will abort due to unstable process conditions and if the test tone level is positive, then the recently calculated MSC and tone level values are written into the appropriate computer operable memory registers and meter verification is initiated.

BRIEF DESCRIPTION OF THE DRAWINGS

FIG. 2 shows a method for determining test tone levels.

DETAILED DESCRIPTION OF THE INVENTION

Figure 1:
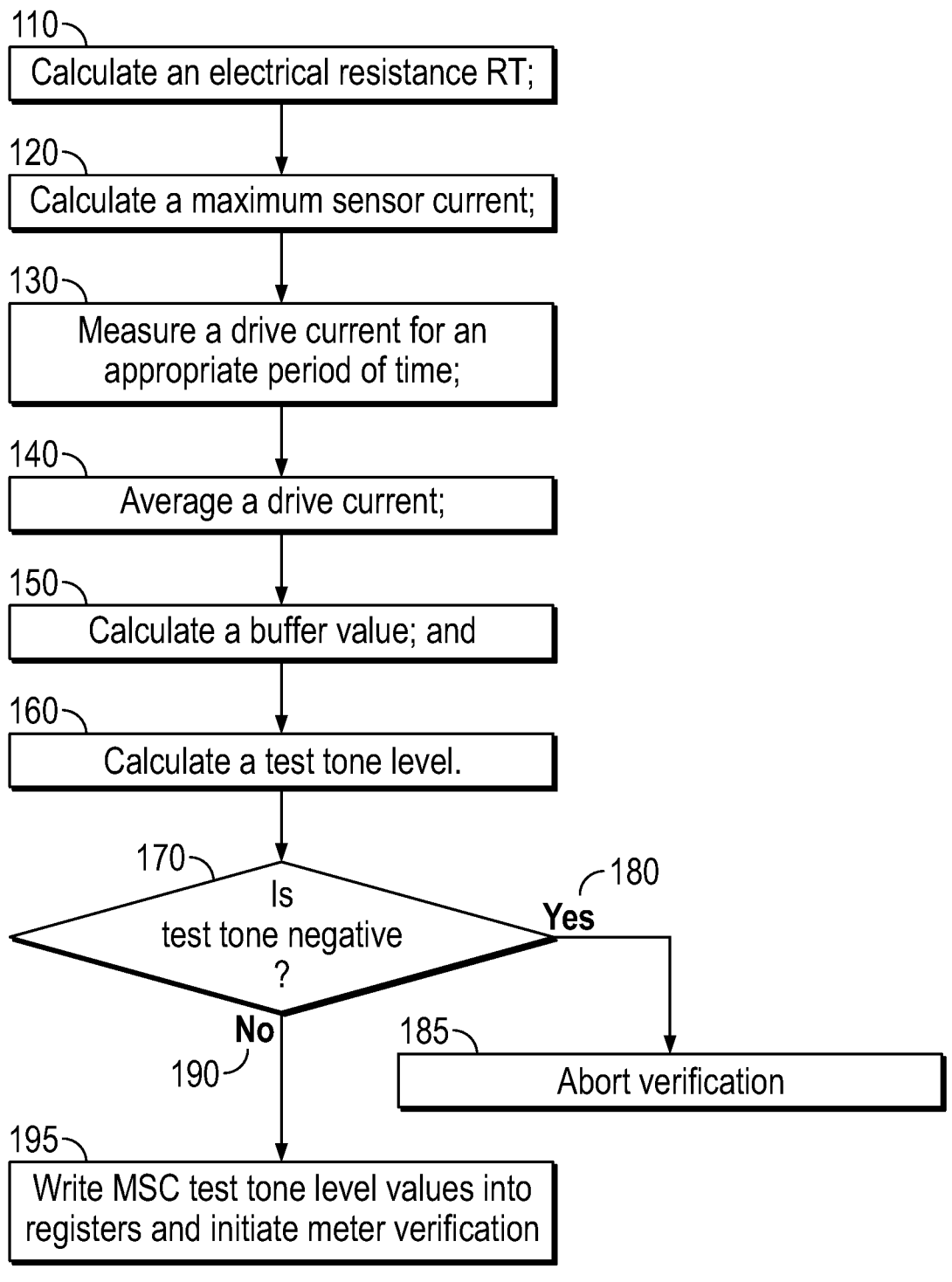
FIG. 1 shows a method for determining and employing test tone levels.
Figure 3:
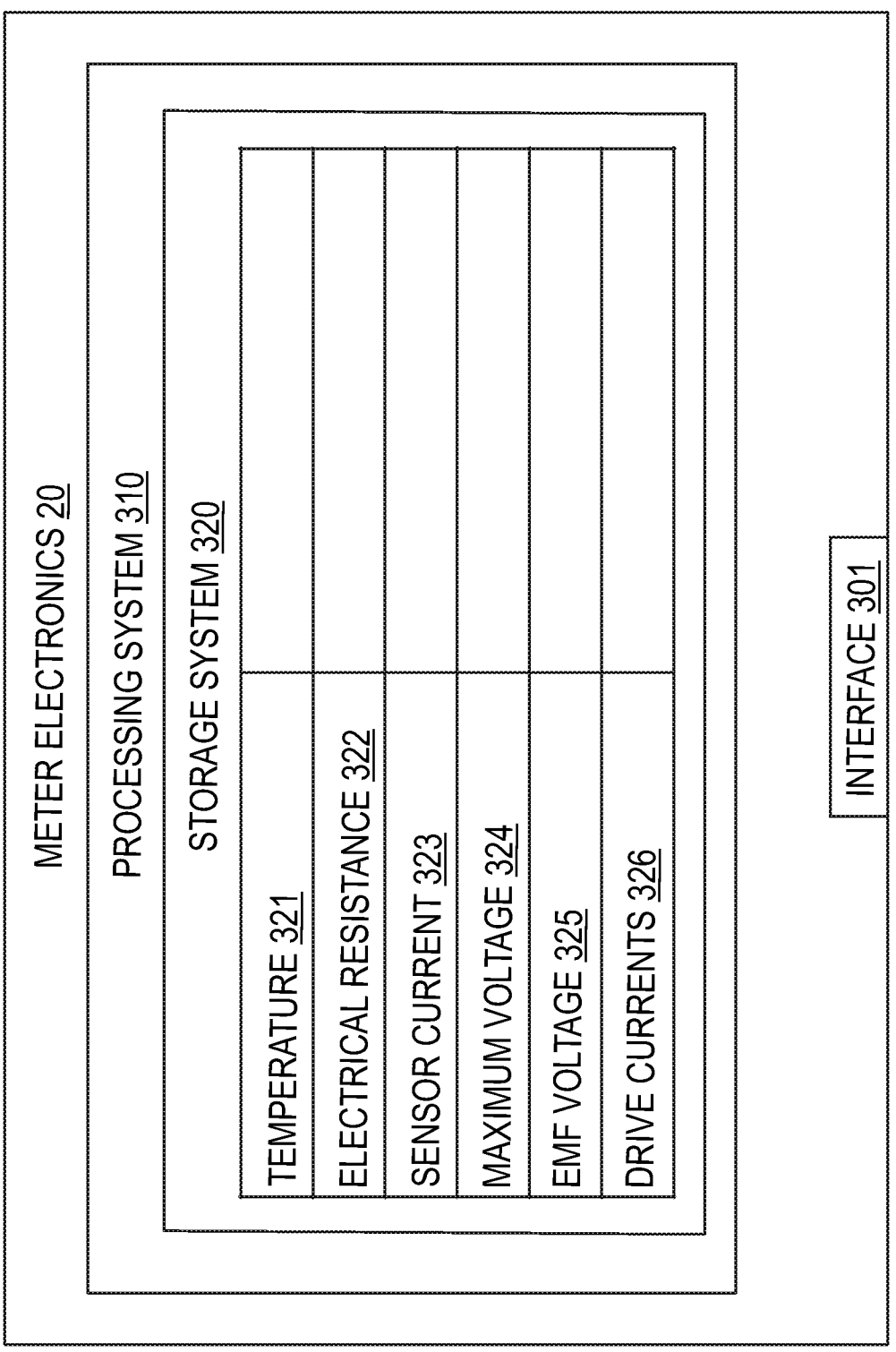
FIG. 3 shows a meter electronics for dynamically optimizing MSC of a flow meter.

FIGS. 1-3 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below can be combined in various ways to form multiple variations of the Application. As a result, the Application is not limited to the specific examples described below, but only by the claims and their equivalents.

The present application is designed to help improve the accuracy of flow meter calibration and verification. Optimal resistance in a drive coil is calculated using a linear extrapolation of the resistance change of the drive circuit with respect to temperature. The optimal resistance is then used to calculate the proper MSC value using an equation derived from Ohm's law. From the MSC, the optimal value of a test tone is then determined through calculation.

FIG. 1 presents a series of method steps performed in order to calculate an optimal test tone level. The method derives a MSC used during a meter verification process. The steps and the calculations occur prior to meter verification. The calculations in the method employ a computer, a computer memory and a computer operable processor to perform the retrieval of data from memory, storage of data to memory, and mathematical manipulation of the data used in and created by the method.

In the first calculation, the electrical resistance $R_T$ 110 is calculated by using a curve-fit of test data performed by a statistical linear regression analysis. Alternately, a known resistance change of the coil wire with respect to temperature may be used instead of performing any calculation.

Next, the resistance $R_T$ 110 is employed in calculation of the MSC 120. The MSC in milliamps may be derived by the formula:

$$MSC = \left[ \frac{V_{max} - \left( \frac{V_{emf}}{x_{rf}} \right)}{R_T} \right] \times 1000.$$

In the formula, the value $V_{max}$ is the maximum voltage supplied by drive amplifier. The value of $V_{max}$ may be in the range of from 8 volts to 10 volts. In an embodiment of the present invention, the value of $V_{max}$ may be about 10 volts. The value $V_{emf}$ is the back EMF of the drive coil. The $V_{emf}$ is measured at room temperature. The value $x_{rf}$ is a reduction factor for drive set-point used during meter verification. The $x_{rf}$ value and other parameters and constants related to the sensors are found in the manufacturer's documentation which accompanies a sensor. The value $R_T$ is the previously mentioned extrapolated drive circuit resistance for the current sensor tube.

The drive current is then measured using a current measuring device such as, but not limited to a multi-meter. The drive current is measured over an appropriate period of time 130. This measurement may be repeated for a plurality of times during the appropriate time periods and the plurality of measurements may be averaged to produce an average drive current for the appropriate time period 140. The appropriate time period may consist of one second, two seconds, a multitude of seconds or any fractional amount of a second.

The buffer value may then be calculated using any one of a number of formulas 150. The buffer value may be predetermined as a set static and unchangeable constant, such as a constant value of 2 milliAmps. The buffer value may also be a percentage of the theoretical tone level and calculated using the formula:

$$\text{Buffer Value} = x_{ptl}(MSC - i_{Drive}),$$

where, $x_{ptl}$=a reduction factor for drive set-point used during meter verification.

The buffer value may also be derived statistically using a factor of the standard deviation of the drive current by using the formula:

$$\text{Buffer Value} = x_{ndev}\sigma,$$

where, $x_{ndev}$=a factor of the standard deviation of the drive current (e.g., a number of standard deviation units); and $\sigma$=a standard deviation.

An electrical current value required to drive the sensor at the moment of calculation called $i_{Drive}$. Once the buffer value, the $i_{Drive}$ and the MSC value have been obtained for the current sensor at the current temperature, these values may be used to calculate the tone level 160 prior to each meter verification run using the formula: Test Tone Level=MSC–$i_{Drive}$–Buffer Value. The test tone level is a tone level in milliAmps at which the meter verification test tones are injected.

The value of the test tone level may be compared to a threshold value of zero in order to determine if the test tone value is positive or negative 170. The comparison to the zero threshold may then be used to determine whether the meter verification process should continue. If the test tone level is negative 180, meter verification will abort 185 due to unstable process conditions. If the test tone level is positive 190, then the recently calculated MSC and the tone level values are written into the appropriate memory registers, and the meter verification is initiated 195.

The drive current $i_{Drive}$ may be sampled by the core processor at a plurality of frequencies, with an optimal frequency of approximately 20 Hz frequency for the appropriate time period. The algorithm that controls the drive of the meter is always working to keep the meter at a target such that the values can be noisy. A single measurement is the least reliable value. Multiple measurements and a calculated average of such multiple measurements may present a more reliable and a more stable value.

Possible embodiments to the present method may comprise incorporating minimum and maximum bounds values into the equations used to derive the test tone level. Furthermore, the drive current may also be averaged over a period of time. This may serve to enhance the accuracy of test tone level in environments that contain large amounts of noise. Finally, a different threshold value other than zero may be used to determine whether the verification will continue 195 or abort 185.

FIG. 2 presents a series of method steps performed in order to calculate an optimal test tone level. First test data or data of known resistance change of a coil wire with temperature is used to calculate an electrical resistance $R_T$, by using a curve-fit of data method 210 or any other type of statistical method that constructs a curve or mathematical function representing a best fit of a series of data points.

The maximum voltage can be measured 212 using a voltage meter. The electromagnetic frequency voltage may also be measured 215 using a meter. The voltages of $V_{max}$ and $V_{emf}$ may be extracted from the meter and used to calculate 220 the MSC through the use of the formula:

$$MSC = \left[ \frac{V_{max} - \left( \frac{V_{emf}}{x_{rf}} \right)}{R_T} \right] \times 1000.$$

The drive current can be measured 230 continuously by a meter over a set period of time. These values can be stored in a computer operable memory 232. This process may be repeated 234 any number of times. The stored values may be recalled to be mathematically averaged 240 to produce an average value. The drive current can also be measured 230 incrementally by taking separate measurements over a given period of time to give incremental values. The incremental values can be stored in a computer operable memory 232 and averaged 240 to produce an average drive current value. This process may also be repeated 234 and used to produce an average value 240.

A buffer value may be a constant set when the meter is initially programmed. The buffer value may also be derived as a statistical factor calculated 250 using the formula: Buffer Value=$x_{ndev}\sigma$, which is a factor of the standard deviation of the drive current. The buffer value may also be determined using a formula incorporating an electrical current value required to drive the sensor at the moment of calculation called $i_{Drive}$, which is retrieved from the sensor documentation. This derivation of the buffer value represents a percentage of the theoretical tone level and can use the formula: Buffer Value=$x_{ptl}$(MSC$-i_{Drive}$).

Once the buffer value has been determined, the test tone level may also be calculated 260 using the formula Test Tone Level=MSC$-i_{Drive}$$-$Buffer Value. This test tone level value provides the optimal test tone at which the testing may operate without being affected by voltage clipping or by changes in temperature while the meter verification process is being performed. This increases the accuracy and reduces stiffness uncertainty in the flow meter apparatus.

FIG. 3 shows a meter electronics for dynamically optimizing MSC of a flow meter. In the embodiment shown in FIG. 3, the apparatus 300 is comprised of a meter electronics 20. The meter electronics 20 can include an interface 301 and a processing system 310. The processing system 310 may include a storage system 320. The storage system 320 may comprise an internal memory as shown, or alternatively, may comprise an external memory.

The interface 301 can receive the sensor signals from a drive mechanism and pick-off sensors via leads. The interface 301 may perform any necessary or desired signal conditioning, such as any manner of formatting, amplification, buffering, etc. Alternatively, some or all of the signal conditioning can be performed in the processing system 310. In addition, the interface 301 can enable communications between the meter electronics 20 and external devices. The interface 301 can be capable of any manner of electronic, optical, or wireless communication.

The interface 301, in an embodiment, may include a digitizer, wherein the sensor signal comprises an analog signal. The digitizer can sample and digitize the analog signal and produce a digital signal. The digitizer can also perform any needed decimation, wherein the digital signal is decimated in order to reduce the amount of signal processing needed and to reduce the processing time.

The processing system 310 can comprise a general purpose computer, a micro-processing system, a logic circuit, or some other general purpose or customized processing device. The processing system 310 can be distributed among multiple processing devices. The processing system 310 can include any manner of integral or independent electronic storage medium, such as the storage system 320.

It should be understood that the meter electronics 20 may include various other components and functions that are generally known in the art. These additional features are omitted from the description and the figures for the purpose of brevity. Therefore, the present invention should not be limited to the specific embodiments shown and discussed.

As shown in FIG. 3, the interface 301 receives a plurality of temperature values 321 and corresponding electrical resistance 322 values, sensor current 323, maximum voltage 324, EMF voltage 325 and drive currents 326. A storage system 320 stores and retrieves the plurality of temperature 321 values and the corresponding electrical resistance 322 values, sensor current 323, maximum voltage 324, EMF voltage 325 and drive currents 326. The processing system 310 measures a plurality of drive currents 326 for an appropriate period of time and performs calculations using the interface 301.

According to an embodiment, the calculations performed further comprise extrapolation calculations using the plurality of temperature 321 values and the corresponding electrical resistance 322 values and produce an optimal resistance, maximum sensor calculations using the electrical resistance 322, a maximum voltage and an EMF voltage computed. The calculations can also include averaging the plurality of drive currents 326, buffer value calculations using the average of the drive currents 326 in the processing system 310, and test tone calculation level using the MSC.

According to an embodiment, the buffer value is calculated using one of the following formulas: Buffer Value=$x_{ptl}$ (MSC−$i_{Drive}$) or Buffer Value=$x_{ndev}\sigma$. According to an embodiment, if the test tone level is negative, then the meter verification will abort due to unstable process conditions and if the test tone level is positive, then the recently calculated MSC and tone level values are written into the appropriate computer operable memory registers and meter verification is initiated.

The detailed descriptions of the above embodiments are not exhaustive descriptions of all embodiments contemplated by the inventors to be within the scope of the application. Indeed, persons skilled in the art will recognize that certain elements of the above-described embodiments may variously be combined or eliminated to create further embodiments, and such further embodiments fall within the scope and teachings of the application. It will also be apparent to those of ordinary skill in the art that the above-described embodiments may be combined in whole or in part to create additional embodiments within the scope and teachings of the application.

We claim:

1. A method for determining and employing a test tone level during a meter verification of a vibrating flow meter, the method comprising:

calculating an electrical resistance of a coil wire of a driver, the coil wire receiving a plurality of drive currents to test an integrity of flow tubes of the vibrating flow meter;

calculating a maximum sensor current (MSC) using the electrical resistance, the maximum sensor current (MSC) being the maximum current a drive amplifier can deliver to the coil wire;

measuring the plurality of drive currents during an appropriate period of time;

averaging the plurality of drive currents;

calculating a buffer value using the average of the plurality of drive currents;

calculating the test tone level of a test tone on either side of a drive frequency of the vibrating flow tubes using the maximum sensor current (MSC) and the buffer value; and operating the vibrating flow meter at the test tone level calculated during meter verification, the test tone level being within a range that avoids voltage clipping, thereby reducing stiffness uncertainty in the vibrating flow meter.

2. The method of claim 1, wherein calculating an electrical resistance further comprises using a curve-fit of test data.

3. The method of claim 1, wherein calculating an electrical resistance further comprises using the known resistance change of the coil wire with temperature.

4. The method of claim 1, wherein calculating the maximum sensor current (MSC) comprises using the formula:

$$MSC = \left[\frac{V_{max} - \left(\frac{V_{emf}}{x_{rf}}\right)}{R_T}\right] \times 1000.$$

where:

$V_{max}$ is the maximum voltage supplied by an amplifier;

$V_{emf}$ is a back electro-motive force of the driver;

$x_{rf}$ is a reduction factor for a drive set-point used during meter verification;

$R_T$ is an electrical resistance.

5. The method of claim 1, wherein the buffer value is calculated using the formula:

$$\text{Buffer Value} = x_{ptl}(MSC - i_{Drive});$$

where:

$i_{Drive}$ is a drive current for the driver; and $x_{ptl}$ is a reduction factor for drive set-point used during meter verification.

6. The method of claim 1, wherein the buffer value is calculated using the formula:

$$\text{Buffer Value} = x_{ndev}\sigma;$$

where:

$x_{ndev}$ is a factor of the standard deviation of the drive current; and $\sigma$ is a standard deviation.

7. The method of claim 1, wherein the test tone level is calculated by the formula:

$$\text{Test Tone Level} = MSC - i_{Drive} - \text{Buffer Value};$$

where:

$i_{Drive}$ is a drive current for the driver.

8. The method of claim 1, wherein if the test tone level is negative, then the meter verification will abort due to unstable process conditions.

9. The method of claim 1, wherein if the test tone level is positive, then the recently calculated maximum sensor current (MSC) and tone level values are written into the appropriate registers and meter verification is initiated.

10. A method of performing temperature compensation of a test tone amplitude during meter verification in a vibrating flow meter with a test tone level, comprising:

calculating an electrical resistance using one of a curve-fit of test data and the known resistance change of a coil wire of a driver with temperature, the coil wire receiving a plurality of drive currents to test an integrity of a flow tube of the vibrating flow meter;

calculating a maximum sensor current (MSC) using the electrical resistance, maximum voltage and an EMF voltage, the maximum sensor current (MSC) being the maximum current a drive amplifier can deliver to the coil wire;

measuring the plurality of drive currents for an appropriate period of time;

averaging the plurality of drive currents;

calculating a buffer value using the average of the drive currents;

calculating the test tone level of a test tone on either side of a drive frequency of the vibrating flow tubes using the maximum sensor current (MSC) and the buffer value; and operating the vibrating flow meter at the test tone level calculated during meter verification, the test tone level being within a range that avoids voltage clipping, thereby reducing stiffness uncertainty in the vibrating flow meter.

11. The method of claim 10, wherein calculating a test tone level using the maximum sensor current (MSC), the buffer value, and the formula:

$$\text{Test Tone Level} = MSC - i_{Drive} - \text{Buffer Value};$$

where:

$i_{Drive}$ is a drive current for the driver.

12. The method of claim 10, wherein the maximum sensor current (MSC) is calculated using the formula:

$$MSC = \left[ \frac{V_{max} - \left( \frac{V_{emf}}{x_{rf}} \right)}{R_T} \right] \times 1000.$$

where:

$V_{max}$ is the maximum voltage supplied by an amplifier;

$V_{emf}$ is the back electro-motive force of the driver;

$R_T$ is a drive circuit resistance of a drive circuit including the driver; and $x_{rf}$ is a reduction factor for drive set-point used during meter verification.

13. The method of claim 10, wherein the buffer value is calculated using the formula:

$$\text{Buffer Value} = x_{ptl}(MSC - i_{Drive});$$

where:

$i_{Drive}$ is a drive current for the driver; and $x_{ptl}$ is a reduction factor for drive set-point used during meter verification.

14. The method of claim 10, wherein the buffer value is calculated using the formula:

$$\text{Buffer Value} = x_{ndev}\sigma;$$

where:

$x_{ndev}$ is a factor of the standard deviation of the drive current; and $\sigma$ is a standard deviation.

15. The method of claim 10, wherein if the test tone level is negative, then the meter verification will abort due to unstable process conditions.

16. The method of claim 10, wherein if the test tone level is positive, then the recently calculated maximum sensor current (MSC) and tone level values are written into the appropriate computer operable memory registers and meter verification is initiated.

17. A meter electronics for dynamically optimizing maximum sensor current in a vibrating flow meter with a test tone level, comprising:

an interface for receiving a plurality of temperature values and corresponding electrical resistance values, sensor current, maximum voltage, EMF voltage and drive currents;

a storage system for storing and retrieving the plurality of temperature values and the corresponding electrical resistance values, sensor current, maximum voltage, EMF voltage and drive currents; and a processing system for measuring a plurality of drive currents to test an integrity of flow tubes of the vibrating flow meter for an appropriate period of time and for performing calculations using the interface, the calculation comprising:

extrapolation calculations using the plurality of temperature values and the corresponding electrical resistance values and produce an optimal resistance;

maximum sensor current calculations using the electrical resistance, a maximum voltage and an EMF voltage computed;

averaging the plurality of drive currents;

buffer value calculations using the average of the drive currents in the processing system; and calculation of the test tone level of a test tone on either side of a drive frequency of the vibrating flow tubes using the maximum sensor current (MSC), wherein the processing system is configured to operate the vibrating flow meter at the test tone level calculated during meter verification, the test tone level being within a range that avoids voltage clipping, thereby reducing stiffness uncertainty in the vibrating flow meter.

18. The apparatus of claim 17, wherein the buffer value is calculated using one of:

$$\text{Buffer Value} = x_{ptl}(MSC - i_{Drive}) \text{ and Buffer Value} = x_{ndev}\sigma;$$

where:

$i_{Drive}$ is a drive current for the driver;

$x_{ptl}$ is a reduction factor for drive set-point used during meter verification;

$x_{ndev}$ is a factor of the standard deviation of the drive current; and $\sigma$ is a standard deviation.

19. The meter electronics of claim 17, wherein if the test tone level is negative, then the meter verification will abort due to unstable process conditions and if the test tone level is positive, then the recently calculated maximum sensor current and tone level values are written into the appropriate computer operable memory registers and meter verification is initiated.

* * * * *